April 18, 1933.  H. V. NIELSEN  1,904,924
MACHINE FOR FILLING BOTTLES AND OTHER VESSELS
Filed May 8, 1928  5 Sheets-Sheet 3

Inventor
HEINRICH VALDEMAR NIELSEN,
By
Toulmin & Toulmin
Attorneys

April 18, 1933.  H. V. NIELSEN  1,904,924
MACHINE FOR FILLING BOTTLES AND OTHER VESSELS
Filed May 8, 1928  5 Sheets-Sheet 4

Inventor
HEINRICH VALDEMAR NIELSEN,
BY
Toulmin & Toulmin
Attorneys

April 18, 1933.   H. V. NIELSEN   1,904,924
MACHINE FOR FILLING BOTTLES AND OTHER VESSELS
Filed May 8, 1928   5 Sheets-Sheet 5

Inventor
HEINRICH VALDEMAR NIELSEN,
BY
Toulmin & Toulmin
Attorneys

Patented Apr. 18, 1933

1,904,924

UNITED STATES PATENT OFFICE

HEINRICH VALDEMAR NIELSEN, OF WEST WHARF, CARDIFF, SOUTH WALES, ASSIGNOR TO THE HYGIENIC MANUFACTURES AND SUPPLIES COMPANY LIMITED, OF LONDON COUNTY, ENGLAND, A BRITISH COMPANY

MACHINE FOR FILLING BOTTLES AND OTHER VESSELS

Application filed May 8, 1928, Serial No. 276,146, and in Great Britain May 27, 1927.

My invention relates to machines for filling receptacles with liquid, or with comminuted or ground dry materials, the liquids being typifiable by milk and the dry material by sugar.

In accordance with this invention for a machine of the type described I provide a supply container, a measuring chamber provided with ports through one of which said chamber is charged from said container and through another of which said chamber is discharged, means for cutting off the supply of flowable material to said chamber, means for cutting off the discharge from said chamber, means for allowing the escape of air from the measuring chamber through the container when the measuring chamber is being charged, other means leading from and forming a direct passage from the measuring chamber to the atmosphere from the commencement of discharge, means being provided whereby there is relative movement between the measuring chamber and the means for cutting off the supply of flowable material. Furthermore an air duct may be provided in the top guide plate of said measuring chamber adapted to admit air to the chamber when discharging, a hole in the cover of the said chamber coming into communication therewith when the chamber is moved to discharge.

The accompanying drawings illustrate various forms of machine made in accordance with this invention.

Figure 1:
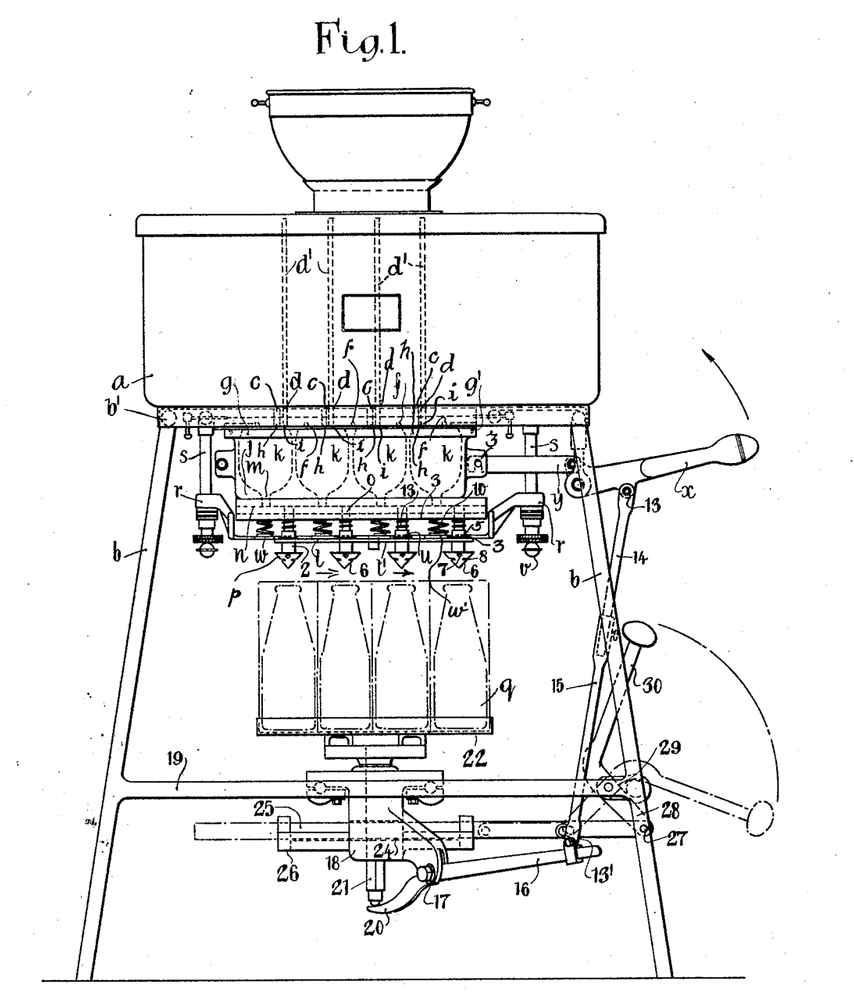
Fig. 1 is a side elevation of one form.
Figure 2:
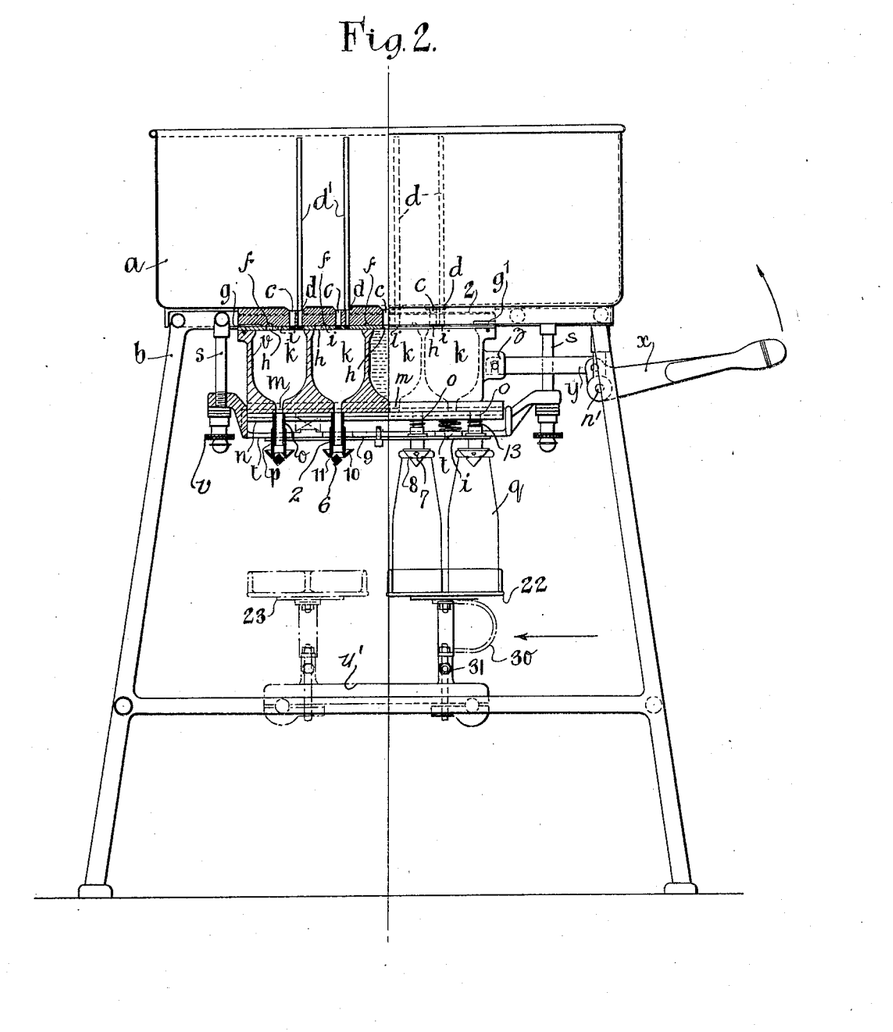
Fig. 2 is a side elevation of a modified form in part section.

The same parts are indicated by the same reference letters as far as possible in figures 1 and 2 of the drawings.

I employ a tank $a$ for the reception of the milk in bulk. The tank is movably supported on a suitable frame $b$. The tank $a$ suitably is of rectangular contour, and in the bottom which, advantageously, may have a top guide plate $b'$ secured to it or may be thickened relatively to the sides, I provide a plurality of ports $c$, $d$, as seen in Fig. 1. The ports are disposed in pairs $c$ and $d$, and preferably, the port $c$ is of greater area than the port $d$, the larger port $c$ being for the passage of milk and the smaller $d$ for the passage of air through an associated pipe $d'$ reaching to the top of the tank. Lateral grooves $f$ for admission of air are also provided in the guide plate $b'$. In close sliding contact with the bottom of the tank and in alignment with each row of ports therein I arrange a top combined slide and cover plate $g$, flanges at $g'$ to constitute a slide valve. In this plate or slide I furnish ports $h$ and ports $i$ in pairs complemental to the pairs of ports $c$, $d$, respectively in the bottom of the tank, which in combination with the ports $h$, $i$, form a valve device.

Depending from the slide valve, and suitably associated with it so as to be liquid and air tight and applied about each pair of ports, I provide a measuring vessel or container, having several measuring chambers $k$, which have ports $m$ for the discharge of milk. Ports $c$, $d$, $h$, $i$, are so spaced as to allow of their communicating with the right chambers $k$ in whatever position the latter may be. This container $j$ is arranged in contactual sliding relation with a subjacent bottom guide or nozzle plate $n$ having ports $o$ terminating in nozzles $p$ for establishing communication between the measuring chambers $k$ and the bottles or receptacles to be filled, ports $o$ corresponding with chambers $k$ and therefore the pairs of ports $c$, $d$ associated with the upper end thereof. Thus the sliding plate $g$ functions as a slide valve relatively to the nozzle plate $n$. The nozzle plate $n$ is jointly supported by the frame of the tank and by the tank through the agency of suitably applied pressure. This is conveniently effected by providing at each end of the nozzle plate $n$ a bracket $r$ in which the end of the plate is adapted to repose removably. Through each bracket $r$ is passed a rod $s$ having one end adapted to engage and disengage the bottom of the tank $a$. The bracket $r$ is adapted for the reception of a spring plate $t$ and bar $t'$ suitably secured thereto provided with apertures $u$ for the passage of the nozzles $p$, the plate being secured to the rods by a nut $v$, and springs $w$ on spring rests $w'$ being applied between the lower face of the nozzle plate $n$ and the upper face of the bar $t$. The slide valve $g$, together with the interposed measuring vessels $k$, $k$, are adapted to be reciprocated as a unit by hand mechanism applied at one end, this suitably comprising a crank lever $x$ pivoted at $n'$ to the tank supporting frame $b$ and associated with a link $y$ connected to a rod $z$ joining the slide valve $g$.

In the construction shown in Fig. 1, Lever $x$ is pivotally connected at 13' by links 14, 15 to an arm 16 of a lever which is pivotally connected at 17 to sleeve 18, sleeve 18 being fixed to the cross member 19 of frame $b$. The other arm 20 of this lever slidably supports spindle 21 which passes slidably through sleeve 18. To the top of spindle 21 is secured the platform 22, which has two sections, the front section only being shown in Fig. 1, which carries the bottles $q$. Platform 22, thus carries two separate sets of bottles which are so arranged as to lie one at a time below nozzles $p$. The above mechanism serves to press the bottles into contact with the nozzles. Spindle 21 is also provided with a pinion 24 which engages with a rack 25 sliding in guides 26 on sleeve 18. One end of said rack 25 is pivotally attached at 27 to an arm 28 of a lever pivoted at 29 on frame $b$. The other arm of the lever is 30.

The above mechanism serves to bring platform 22 and its bottles under the nozzles as required.

The shank 2 of the nozzle $p$ is provided with a projecting member, which may be a wire spring resting in a groove in the shank 2 to ensure that the nozzle keeps a correct longitudinal adjustment with regard to the machine. In the conical head 6 of the nozzle two sets of orifices 7, 8 are provided, each set being similarly disposed with regard to the longitudinal axis of the nozzle. One set of orifices 8 consists of arcuate channels diametrically opposite to each other and concentric with the aforesaid nozzle axis. These arcuate channels 8 are preferably two in number and communicate with the hollow interior 9 of the nozzle shank. They are so shaped that they serve to project the discharging milk on to the side of the bottles $q$. The other set of channels 7 is preferably four in number and of circular cross section and gives communication between the external conical surface 10 of the nozzle and an annular cavity 11 in the base of the cone and so to the exterior of the nozzle shank. These channels 7 serve to permit of escape of air from the bottle $q$ whilst milk is entering it.

Further to break up the discharging milk and prevent foaming, the nozzle head is provided with a detachable closely fitting conical jacket of wire gauze (not shown).

A spring 13 is provided on the shank to ensure the nozzle head being kept in contact with the bottle.

It will thus be seen that assuming the parts are assembled in the operative position, and the hand mechanism operated by levers 30 and $x$ to bring the required bottles under the nozzles and to bring the ports $h$, $i$, in the upper slide valve $g$ into register with those $c$, $d$ in the bottom of the tank $a$, that communication will be established between the tank and the measuring vessels $k$, while the ports $o$ in the plate $n$ will be out of register with the nozzles $p$ associated with the bottles or receptacles $q$ to be filled.

In use the nozzle $p$ is slipped into position on the machine, the bottle $q$ placed thereunder and pressed into contact with the nozzle head 6 so as to centre properly. When the milk is allowed to discharge, it passes through the arcuate channels 8 and is broken up by the gauze cover 12 and flows down the sides of the bottles without foaming. The air escapes to the atmosphere through the channels 7 provided for it as above described, and foam escaping is collected in the annular cavity 11 and drops back into the bottle, thus keeping the exterior of the bottle free from milk.

When handle $x$ is operated in a counter clockwise direction as shown by arrow A (Fig. 1) the measuring chambers $k$ are slidden to the left and ports $h$, $i$, come into communication with the ports $c$, $d$ and ports $m$ are cut off from communication with nozzles $p$. The pipes $d'$ are partially filled with milk to the level of the milk supply in tank $a$ owing to the rise of the milk therein during the interval between the filling of the container and the discharge into the bottle having taken place, when the delivery movement takes place, this milk together with the main supply in tank $a$ being cut off from vessels $k$ on the movement of the measuring chambers to the position for discharge. The tank $a$ is open to the atmosphere and communicates with chambers *k* through corresponding ports *c*, *h*, and *d*, *i*. The movement of the measuring chambers *k* causes grooves *f* to be cut off from grooves *h*.

The milk from the tank *a* then runs into chambers *k* through ports *c*, *h*, the air escaping through ports *d*, *i*, and pipes *d'*. The milk cannot escape from the chambers thus filling.

On operating handle *x* in a clockwise direction to slide chambers *k* in the direction of the arrow B (Fig. 1), ports *h* move from under ports *c* and so the milk supply to chambers *k* from tank *a* is cut off. At the same time ports *h* come under grooves *f*, which allows chambers *k* to communicate with the atmosphere, and air to enter said chambers and ports *m* come over nozzles *p*. Since air can enter the chambers *k* the milk escapes into the bottles *q*.

It will further be seen that when it is required to detach the measuring vessel *j* with its associated slide *g*, the terminal rods *s* are released from the bottom of the tank *a* whereupon the spring plate *t* and nozzle plate *t* can be lowered to free the slide valves and the measuring vessels.

In the form illustrated in Fig. 2, the main difference from the previous form resides in that half the measuring chambers fill whilst the other half empty, and the bottle platforms always remain under their respective measuring chambers.

The ports *h*, *i* in the bar *g* and the ports *o* in the bar *n* are in this case arranged so that whilst for example, the right hand two chambers *k* (Fig. 2) have their bottom ports *o* closed and their top ports *h*, *i* open to the tank *a* and are, consequently filling, the left-hand-half containing two chambers (Fig. 2) have their top ports *h*, *i* closed to the milk supply, and their bottom ports *o* open to the bottles and are consequently emptying. The ports *h* and grooves *f* act together in each half as in the previous example.

The platform 22, on which the bottles stand is supported by springs 30' secured to brackets 31 which are suitably secured to frame *b*. The bottles are thus always kept spring pressed against the nozzles *p*, but are easily removable by hand.

Handle *x* is operated as in the previous example to slide the measuring chambers so as to fill the bottles as required.

In the foregoing examples, I have described the measuring vessels as being adjustable in a linear direction relatively to the bottom of the tank and the delivery nozzle plate, but I may adapt each measuring vessel to be rotatable relatively thereto to effect the filling from the tank, and the subsequent delivery to the receptacle to be filled.

In all the following examples a vent pipe passing through the source of supply is employed and subsidiary air ducts or grooves are provided substantially as in the preceding examples.

Figure 3:
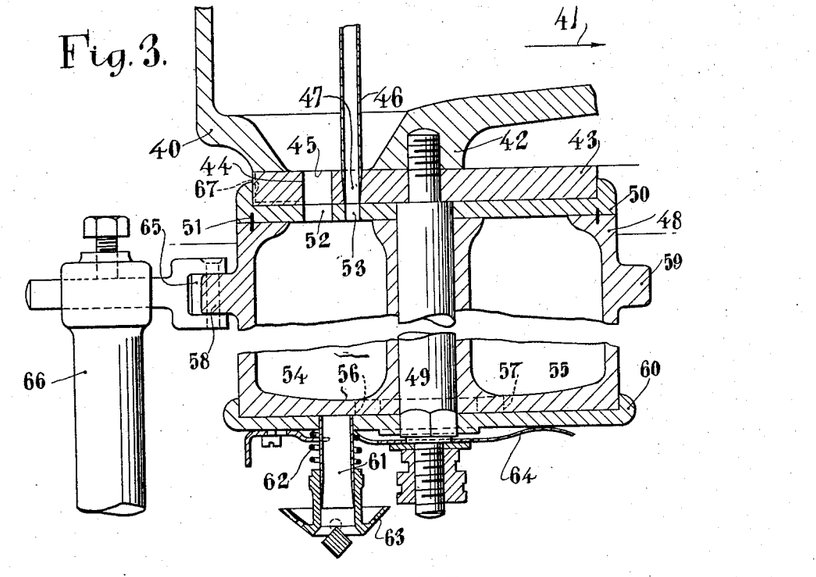
Fig. 3 is a part sectional elevation of a modified form.
Figure 4:
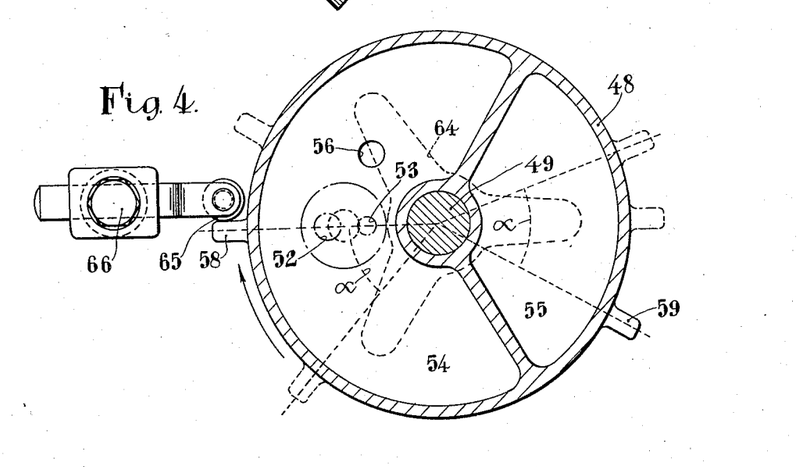
Fig. 4 is a horizontal section.

In the modified form illustrated in Figs. 3 and 4, the container 40 is adapted to rotate about a vertical axis not shown, situated in the direction of the arrow 41'. The bottom of the container is provided with one or more enlargements 42 to each of which is secured a disc 43 provided with a port 44, registering with the port 45 of container 40. An air pipe 46 is provided for a purpose similar to that described with reference to the previous examples. This pipe is disposed in port 47 in disc 43. The measuring vessel 48 is rotatably disposed on spindle 49 which is non-rotatably secured to container 40 and has its top formed by flanged disc 50 secured to vessel 48 by pins 51 and which engages rotatably with disc 43. Ports 52, 53 are provided in disc 50 and are adapted to engage with ports 44, 47 in a certain position relative to discs 43 and 50. The vessel 48 may be divided into two measuring chambers 54, 55, adapted to contain, say, a pint and a half pint, or any other desired measure. These chambers can be alternatively put in use by rotating and securing disc 50 so that ports 52, 53 register with the required chamber. The bottoms of chambers 54, 55 are provided with ports 56, 57 for a purpose hereinafter to be described.

Lugs 58, 59 are provided on the exterior of vessel 48 at places suitably chosen for a purpose hereinafter to be described. The bottom of vessel 48 rests in flanged disc 60 which is non-rotatably secured to spindle 49.

Disc 60 is provided with a port 61 into which is secured the hollow stem of nozzle 62, which nozzle has a spring pressed head 63 and is of the kind described with reference to the previous examples. A spring 64 is provided to press discs 50, 60, and vessel 48 into contact with the container 40 and prevent leakage.

A projecting member 65 on support 66 is secured to the machine so as to engage with lug 58 and rotate vessel 48 in a counter clockwise direction through an angle α about its spindle 49. Another similar member (not shown) is provided on the opposite side of vessel 48 to engage with lug 59, and rotate vessel 48 in a clockwise direction through an angle α about its spindle 49. Ports 52, 53 and 56 are so arranged that when ports 52, 53 communicate with ports 44, 47, then port 56 does not communicate with port 61; by rotation of vessel 48 through an angle α about its spindle 49, in a counter clockwise direction, port 56 is put into communication with port 61, and ports 52, 53 out of communication with ports 44, 47. Rotation of vessel 48, about its spindle 49 in a clockwise direction through an angle α has the contrary effect. This rotation through an angle α in counter-clockwise and clockwise directions is respectively produced by contacts of projection 65 and lug 58 and of the other projection (not shown) and lug 59, which contacts are made by the rotation of container 40 about its axis. To avoid an air lock when discharging grooves 67 are provided at suitable places in discs 53 and allow air to enter vessel 48 when ports 52, 53 are out of communication with ports 45, 47.

The operation of filling bottles with liquid, say, is substantially the same as that described with reference to the previous example, the filling and emptying being controlled by the rotation of container 48 on its spindle 49.

Assuming the chamber 54 is full and the apparatus is leaving the position illustrated in Figs. 3 and 4, liquid will have risen in pipe 46 and the roller on member 65 will push the lug 58 back through an angle $\alpha$ in a counter-clockwise direction relative to the spindle 49 of the vessel 48. Consequently, vessel 48 revolves relative to plate 43 and ports 52 and 53 will be removed from registration with ports 44, 47 and therefore the fluid supply will be cut off. At the same time ports 56 and 61 are brought into register. Liquid thereupon flows from the chamber through nozzle head 63 into the bottle, air flowing simultaneously into chamber 54 through groove 67. By the time the chamber 54 is emptied the container 40 has travelled far enough round its axis for lug 59 to meet the projection above described (but not shown), which pushes it back through an angle $\alpha$ in a clockwise direction. Vessel 48 revolves about plate 43 and by this motion takes port 56 out of register with port 61 and cuts off the discharge of liquid. At the same time ports 52 and 53 come back into register with ports 44 and 47. The liquid from container 40 flows into chamber 54. The process is then repeated.

Figure 5:
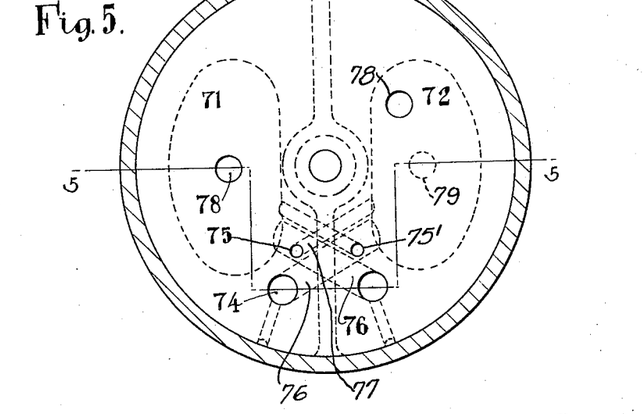
Fig. 5 is a horizontal section of a modified form.
Figure 6:
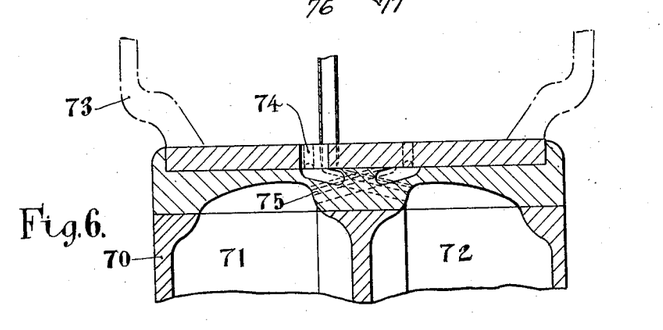
Fig. 6 is a part-sectional elevation on line 5—5 in Fig. 5.

In the modified form of the invention illustrated by way of example in Figs. 5 and 6, I provide a measuring vessel 70 having two equal measuring chambers 71, 72, adapted to contain a pint each say. This vessel 70 is disposed on a spindle 70' rotatably attached by a spring pressed disc to container 73, substantially as described with reference to the previous example. This cross-over construction is so designed however that whilst chamber 71 is filling, chamber 72 is discharging and vice versa. To effect this, the discharge and air ports 74, 75 from the container 73 and on one side thereof communicate by diagonally disposed passages 76, 77, with vessel 72 on the opposite side and fill it whilst the discharge port 78' of chamber 71 discharges into a bottle, and vice versa. There is a similar disposition of ports and passages, 74', 75', 76', 77' between container 73 and chamber 71. As illustrated in the drawings, ports 74 and 75 connect with chamber 72 so that milk can run into it from container 73. At the same time communication between chamber 72 and the bottle under it is cut off as ports 78, 79 do not register. Furthermore at the same time port 78' of chamber 71 registers with the port leading to the bottle under it and allows milk to flow into the bottle while chamber 71 is cut off from ports 74', 75' in container 73, so that no milk can flow into it. On rotation of vessel 70 about its axis the action is reversed, that is to say chamber 71 is filled and chamber 72 is emptied. Thus the total time of filling and discharge of a measuring chamber is halved. This is very useful where the bottles are supplied by a travelling band which travels at the same rate velocity as the circumferential velocity of container 73. The reciprocation of vessel 70 on its spindle may be effected by suitable lugs thereon engaging with suitable projection in the machine, as described with reference to the previous example.

Assuming that the apparatus is in the position illustrated in Figs. 5 and 6, in which chamber 71 is emptying and chamber 72 is filling, as the liquid flows out of chamber 71 by ports 78', 79', which are in register, air flows into said chamber 71 by groove $76^3$ and channel 76'. At the same time chamber 72 is filling with liquid from container 73 owing to ports 74 and 75 registering with channels 76, 77, and air flowing out of chamber 72 by tube $70^2$.

In the modification illustrated in Figs. 7, 8 and 9, the device generally resembles that described with reference to Figs. 5 and 6. In this case however there are no cross over ports at the top of the measuring vessel 80. The supply ports 81 and 82 are disposed centrally of the equal measuring chambers 83 and 84. Supply port 84' in the main container 80' is so arranged that when it communicates with port 81 in measuring chamber 83, it is out of communication with port 82 in measuring chamber 84. The alternate communications are established by the reciprocation of vessel 80 on its axis. The manner of and means for discharging air from the necessary vessels is substantially the same as hereinbefore described; similarly with regard to the reciprocation of vessel 80 on its axis. The alternate discharge is effected through ports 85, 86, in the measuring chambers and channels 87, 88 in the flanged supporting disc 89, said channels leading to a common delivery duct 90. Channels 87, 88, at their upper ends turn inwards to the axis of the measuring vessel, and ports 85, 86, are so disposed that when port 85 is in communication channel 87, the other port 86 is out of communication with its channel 88, the angular displacement of ports 85, 86, with respect to the axis 80² of vessel 80 effecting the change in supply to vessels 83, 84, and discharge therefrom.

Figure 7:
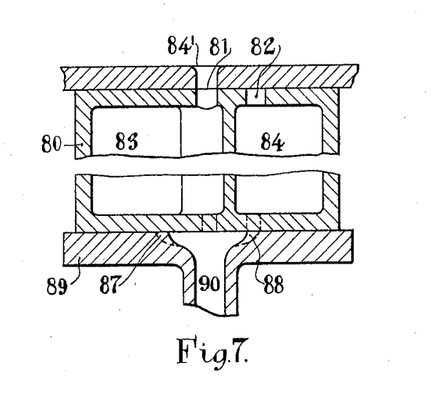
Fig. 7 is a part-sectional elevation on lines 8—8 and 8a—8a in Fig. 8 showing a modification.
Figure 8:
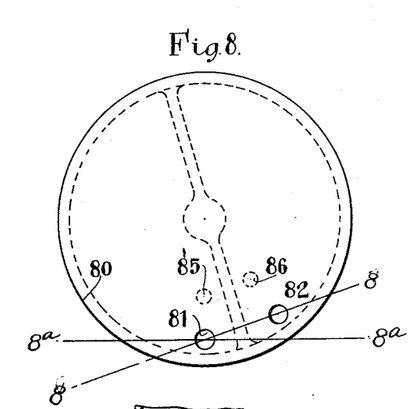
Fig. 8 is a part plan of Fig. 7.
Figure 9:
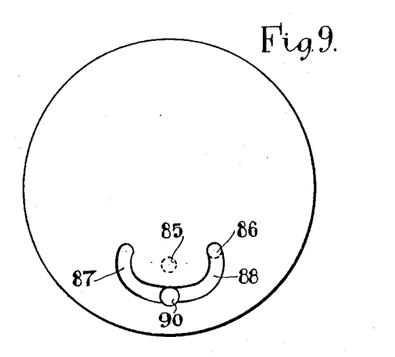
Fig. 9 is a part plan of the bottom disc shown in Figs. 7 and 8.

Assuming the apparatus is in the position illustrated in Figs. 7, 8 and 9, in which chamber 83 is filling and chamber 84 is discharging, liquid enters chamber 83 from the main container 80′ by ports 84′ and 81. At the same time air enters chamber 84 through a similar groove (not shown) as liquid discharges from said chamber 84 through port 86 and channel 88 to discharge duct 90.

Figure 10:
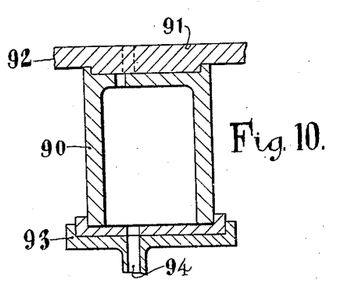
Figs. 10 and 11 illustrate a part-sectional elevation of a modification diagrammatically.

In one form of this modified structure, as illustrated in Fig. 10, I recess the upper end of the measuring vessel 90′ to embrace a circular enlargement 91 at the bottom of the tank 92 and the lower end I screw into a disc 93 rotatably mounted in a disc furnished with a nozzle 94 for filling the receptacle. The discs and the two ends of the measuring vessel are provided with ports as, and for, the purpose mentioned in the other example, and the assembly of the respective parts is maintained through the agency of springs substantially as described in connection with the other example, that is to say each nozzle disc is engaged by a common bar, which is connected to the tank bottom through the agency of rods and springs applied between the ends of the rods and the face of the bar. The several measuring vessels are simultaneously operated to establish the communication with the tank on the one hand, and with the receptacle to be filled on the other hand, this being accomplished by hand mechanism comprising a rod or lever engaging arms provided on the measuring vessels, the respective arms being suitably provided at the lower ends of the measuring vessels.

Figure 11:
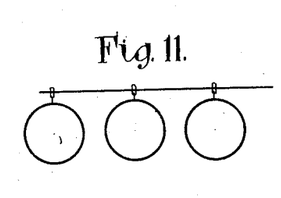
Figure 12:
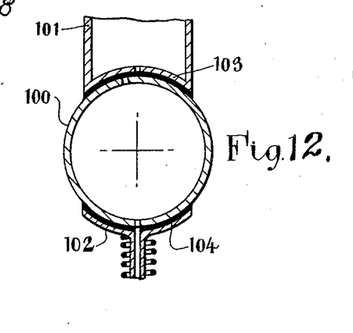
Fig. 12 illustrates a modification diagrammatically.

In another form of rotatable arrangement of the measuring vessels 100, as in Figs. 11 and 12, I, instead of positioning them vertically, mount them horizontally. In this case I construct the bottom of the tank 101 and the nozzle plate 102 much as in the first described example, and I recess the bottom of the tank and the top of the nozzle plate about the respective ports so as to form seats 103, 104, in which the measuring vessel is positioned, the body of the vessel being suitably flanged to engage the sides of the tank bottom and the nozzle plate and the body being ported to agree with the ports in the tank bottom and the nozzle plate. The nozzle plate is maintained in position as in the other examples, that is through the agency of depending rods and springs.

All the measuring vessels may be operated simultaneously or one row may be operated so that while the measuring vessels are filling, those of an adjacent row or rows may be delivering.

Figure 13:
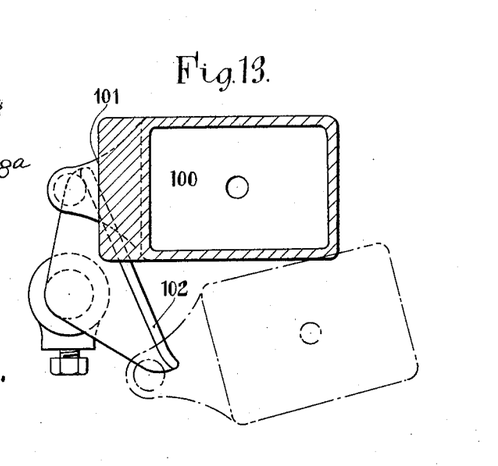
Fig. 13 illustrates a further modification.

In the modification illustrated in Fig. 13, one or more measuring chambers 100′ are slidably attached to a main container which is adapted to rotate about an axis. The main container and the measuring chamber or chambers are provided with ports suitably disposed for supply and discharge substantially in the manner described with reference to the previous examples. The reciprocation of the measuring chamber 100′ is produced by engagement of projections or rollers 101′ on the said chambers with cam members 102′ suitably disposed on the machine in the path of the said measuring chamber or chambers. The cam members or grooves may be on the chambers and the projections or rollers on the machine. By the reciprocation is thus produced the alternate registration of ports between the main container and the measuring vessels, and between the measuring vessels and the bottles.

There is no compression of air. A measuring container gives predetermined quantities by "strike" measure. All parts having tendency to leak are under direct spring pressure. The tops of the measuring chambers are domed as illustrated in order that all bubbles or foam may be brought immediately under the air outlet.

In every instance it will be seen that all the joints are of the metal to metal variety obviating the use of packings.

Any suitable power may be employed for driving the machine, for example, electric power.

What I claim and desire to secure by Letters Patent is:—

1. For a machine for filling bottles and other vessels with liquid and other flowable material, a supply container, a measuring chamber provided with ports through one of which said chamber is charged from said container and through another of which said chamber is discharged, means for cutting off the supply of flowable material to said chamber, means for cutting off the discharge from said chamber, means for allowing the escape of air from the measuring chamber through the container when the measuring chamber is being charged, other means leading from and forming a direct passage from the measuring chamber to the atmosphere from the commencement of discharge, means being provided whereby there is relative movement between the measuring chamber and the means for cutting off the supply of flowable material.

2. For a machine for filling bottles and other vessels with liquid and other flowable material, a supply container, interchangeable measuring chambers of different sizes provided with ports through some of which said chambers are charged from the container and through others of which they are discharged, means for cutting off the supply of flowable material to said chambers, means for cutting off the discharge from said chambers, means for allowing the escape of air from the measuring chambers through the container when the measuring chambers are being charged, a subsidiary air conduit leading from and forming a direct air passage from the discharging measuring chamber to the atmosphere from the commencement of discharge.

3. For a machine for filling bottles and other vessels with liquid and other flowable material, a supply container, a measuring chamber provided with ports through one of which said chamber is charged from said container, and through another of which said chamber is discharged, a slide valve device for cutting off the supply of flowable material to said chamber, means for operating said slide valve device, means for cutting off the discharge from said chamber, a pipe for the escape of air from the measuring chamber through the container, said pipe forming an air exit when the measuring chamber is being charged, and means for delivering accurately measured quantities of flowable material independently of the flowable material which may be in the pipe.

4. For a machine for filling bottles and other vessels with liquid and other flowable material, a supply container, measuring chambers provided with ports through which said chambers are charged from said container and with ports through which they are discharged, a slide valve device for cutting off the supply of flowable material to said chambers, means for operating said slide valve device, means for cutting off the discharge from said chambers, pipes for the escape of air from the measuring chambers through the container, said pipes forming air exits when the measuring chambers are being charged, subsidiary air conduits leading from and forming direct air passages from the measuring chambers to the atmosphere from the commencement of discharge, inlet ports, valves and cutting off means being so arranged that a measuring chamber is being charged when another is being discharged.

5. For a machine for filling bottles and other vessels with liquid and other flowable material, a supply container, measuring chambers provided with ports through which said chambers are charged from said container and with ports through which they are discharged, a slide valve device for cutting off the supply of flowable material through said chambers, means for cutting off the discharge from said chambers, pipes for the escape of air from the measuring chambers through the source of supply, said pipes forming air exits when the measuring chambers are being charged, subsidiary air conduits leading from and forming direct air passages from the measuring chambers from the commencement of discharge of said chambers, and means whereby there is relative reciprocatory movement between the measuring chambers and the valve device during operation of the machine.

6. For a machine for filling bottles and other vessels with liquid and other flowable material, a supply container, a measuring chamber of the capacity to be measured, said measuring chamber being provided with ports through one of which said chamber is charged from said container and through another of which said chamber is discharged, a slide valve device for cutting off the supply of flowable material to said chamber, means for operating said slide valve device, means for cutting off the discharge from said chamber, a pipe for the escape of air from the measuring chamber through the source of supply when the measuring chamber is being charged, a subsidiary air leading from and forming a direct air passage to the atmosphere from said chamber from the commencement of discharge.

7. For a machine for filling bottles and other vessels with liquid and other flowable material, a supply container, a measuring chamber provided with ports through one of which said chamber is charged from the container and through another of which said chamber is discharged, means for cutting off the supply of flowable material to said chamber, means for cutting off the discharge from said chamber, a pipe for the escape of air from the measuring chamber through the source of supply, said pipe forming an air exit when the measuring chamber is being charged, and a subsidiary air conduit leading from and forming a direct passage from the measuring chamber to the atmosphere from the commencement of discharge, means being provided whereby there is relative movement between the measuring chamber and the means for cutting off the supply of liquid and other flowable material.

8. For a machine for filling bottles and other vessels with liquid and other flowable material, a supply container, measuring chambers provided with ports through which said chambers are charged from the container and with ports through which they are discharged, a slide valve device for cutting off the supply of flowable material to said chambers, means for operating said slide valve device, means for cutting off the discharge from said chambers, pipes for the escape of air from the measuring chambers through the source of supply, when the measuring chambers are being charged, subsidiary air conduits leading from and forming direct air passages from the measuring chambers to the atmosphere from the commencement of discharge, means being provided whereby there is direct spring pressure on all joints prone to leakage.

9. For a machine for filling bottles and other vessels with liquid and other flowable material, a supply container, a reciprocatory measuring chamber of the capacity to be measured and provided with ports through one of which said chamber is charged from said container and through another of which said chamber is discharged and means for reciprocating said chambers, a slide valve device for cutting off the supply of flowable material to said chamber, means for cutting off the discharge from said chamber, a pipe for the escape of air from the measuring chamber through the source of supply when the measuring chamber is being charged, and a subsidiary air conduit leading from and forming a direct passage from the measuring chamber to the atmosphere from the commencement of discharge.

10. For a machine for filling bottles and other vessels with liquid and other flowable material a supply container, measuring chambers of the capacity to be measured provided with ports through which said chambers are charged from the container and with ports through which they are discharged, a plate disposed between said container and said chambers, a slide valve device for cutting off the supply of flowable material to said chambers, means for operating said slide valve device, means for cutting off the discharge from said chambers, pipes for the escape of air from the measuring chambers through the source of supply when the measuring chambers are being charged, subsidiary air conduits in said plate leading from and forming direct air passages from the measuring chambers to the atmosphere from the commencement of discharge.

11. For a machine for filling bottles and other vessels with liquid and other flowable material, a supply container, a rotatable measuring chamber provided with ports through one of which said chamber is charged from said container and through another of which said chamber is discharged, a slide valve device for cutting off the supply of flowable material through said chamber, means for operating said slide valve device, means for cutting off the discharge from said chamber, a pipe for the escape of air from the measuring chamber through the source of supply when the measuring chamber is being charged, and a subsidiary air conduit leading from and forming a direct passage from the measuring chamber to the atmosphere from the commencement of discharge.

12. For a machine for filling bottles and other vessels with liquid and other flowable material, a supply container, rotatable measuring chambers of different sizes provided with ports through some of which said chambers are charged from the container and through others of which they are discharged, a slide valve device for cutting off the supply of flowable material to said chambers, means for operating said slide valve device, means for cutting off the discharge from said chambers, pipes for the escape of air from the measuring chambers through the source of supply when the measuring chambers are being charged, and subsidiary air conduits leading from and forming direct air passages from the measuring chambers to the atmosphere from the commencement of discharge.

13. For a machine for filling bottles and other vessels with liquid and other flowable material, a supply container, rotatable measuring chambers provided with cross over ports whereby one of said chambers is charged from the container whilst another of said chambers is being discharged, a slide valve device for cutting off the supply of flowable material through said chambers, means for operating said slide valve device, means for cutting off the discharge from said chambers, pipes for the escape of air from the measuring chambers through the source of supply, said pipes forming air exits when the measuring chambers are being charged, and subsidiary air conduits leading from and forming direct air passages from the measuring chambers from the commencement of discharge of said chambers.

14. For a machine for filling bottles and other vessels with liquid and other flowable material, a supply container, a measuring chamber with a top of less diameter than the body of the chamber, said measuring chamber being provided with ports through one of which said chamber is charged from the container and through another of which said chamber is discharged, a slide valve device for cutting off the supply of flowable material to said chamber, means for operating said slide valve device, means for cutting off the discharge from said chamber, a pipe for the escape of air from the measuring chamber through the source of supply when the measuring chamber is being charged, and a subsidiary air conduit leading from and forming a direct air passage to the atmosphere from said chamber from the commencement of discharge.

15. For a machine for filling bottles and other vessels with liquid and other flowable material, a supply container, rotatable interchangeable measuring chambers of different sizes provided with ports through some of which said chambers are charged from the container and through others of which they are discharged, means for rotating said chambers and a slide valve device for cutting off the supply of flowable material through said chambers, means for cutting off the discharge from said chambers, pipes for the escape of air from the measuring chambers through the source of supply, said pipes forming air exits when the measuring chambers are being charged, and subsidiary air conduits leading from and forming direct air passages from the measuring chambers from the commencement of discharge of said chambers.

16. For a machine for filling bottles and other vessels with liquid and other flowable material, a supply container, a measuring chamber, said measuring chamber being provided with ports through one of which said chamber is charged from said container and through another of which said chamber is discharged, a receptacle holder, a slide valve for cutting off the supply of flowable material to said chamber, means for operating said slide valve and said holder simultaneously, means for cutting off the discharge from said chamber, a pipe for the escape of air from the measuring chamber through the source of supply when the measuring chamber is being charged, and a subsidiary air conduit leading from and forming a direct air passage to the atmosphere from said chamber from the commencement of discharge.

17. For a machine for filling bottles and other vessels with liquid and other flowable material, a supply container, rotatable measuring chambers provided with centrally disposed supply ports through which said chambers are charged from said container and with ports through which they are discharged, a common discharge conduit through which said ports discharge, a slide valve device for cutting off the supply of flowable material through said chambers, means for operating said slide valve device, means for cutting off the discharge from said chambers, pipes for the escape of air from the measuring chambers through the source of supply, said pipes forming air exits when the measuring chambers are being charged, and subsidiary air conduits leading from and forming direct air passages from the measuring chambers from the commencement of discharge of said chambers.

18. For a machine for filling bottles and other vessels with liquid and other flowable material, a supply container, a rotatable cylindrical measuring chamber of a capacity sufficient to contain the full quantity of the material to be measured, said measuring chamber being provided with ports through one of which said chamber is charged from the container and through another of which said chamber is discharged, a slide valve for cutting off the supply of flowable material to said chamber, means for operating the slide valve, means for cutting off the discharge from said chamber, a pipe for the escape of air from the measuring chamber through the source of supply when the measuring chamber is being charged, and a subsidiary air conduit leading from and forming a direct air passage to the atmosphere from said chamber from the commencement of discharge.

In testimony whereof I affix my signature.

HEINRICH VALDEMAR NIELSEN.